Sept. 23, 1969  N. A. COLEMAN ET AL  3,469,088
APPARATUS FOR CLEANING THE LENS OF A VEHICLE RUNNING LIGHT
Filed May 18, 1966
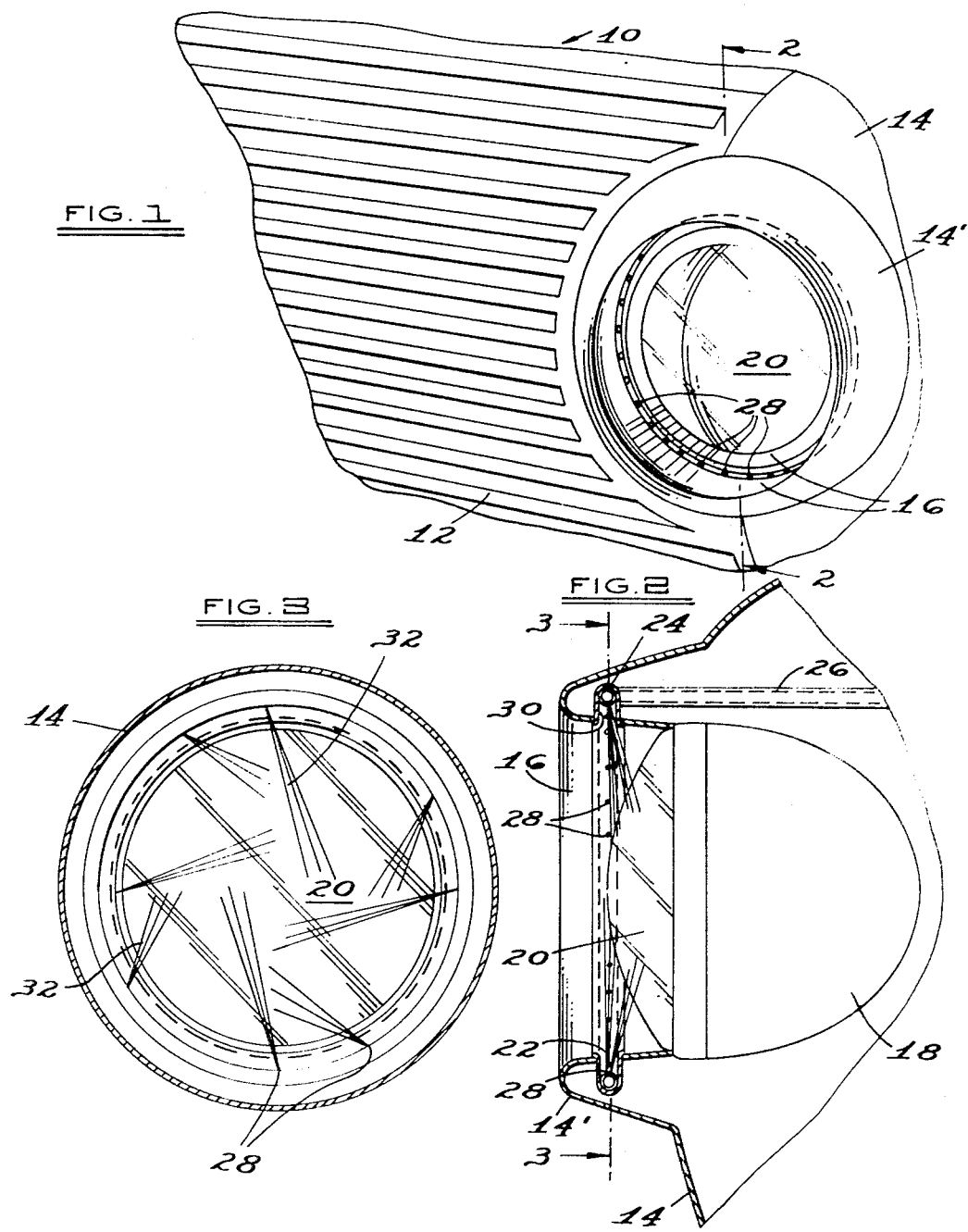
INVENTORS
NEIL A. COLEMAN
DONALD B. WEINFURTHER
BY
John R. Faulkner
Robert E. McCollum
ATTORNEYS United States Patent Office 3,469,088
Patented Sept. 23, 1969

3,469,088
APPARATUS FOR CLEANING THE LENS OF A VEHICLE RUNNING LIGHT
Neil A. Coleman, Dearborn, and Donald B. Weinfurther, Livonia, Mich., assignors to Ford Motor Company, Dearborn, Mich., a corporation of Delaware
Filed May 18, 1966, Ser. No. 550,983
Int. Cl. B08b 3/04; B60q 1/04
U.S. Cl. 240—7.1                                    3 Claims

ABSTRACT OF THE DISCLOSURE

Apparatus for cleaning the lens of a vehicle running light without interrupting the operation of the vehicle. This apparatus includes a source of pressurized cleaning fluid and a conduit interconnected with this fluid source. A plurality of angularly inclined orifices are formed in the conduit to discharge cleaning fluid therefrom in distinct pressurized streams onto the surface of the light lens such that the discharged fluid flows on the lens surface in a circular pattern to scrub road grime from the surface.

This invention relates to apparatus for cleaning the lens of a running light of a motor vehicle and in particular the lens of a motor vehicle headlight.

Persons familiar with the operation of a motor vehicle are cognizant of the visibility problems attendant night driving when road surfaces are covered with rain, snow or slush. These substances, together with road dirt, are thrown against the vehicle, especially in traffic necessitating the close following of another vehicle. The motor vehicle running light lenses, especially the headlight lenses, become covered with foreign substances that greatly impair illuminating efficiency and contribute to decreased visibility of the vehicle operator. This unsafe condition may be temporarily remedied by a manual cleaning of the running lights lenses. However, resumption of vehicle operation invariably leads to an almost immediate return of this unsafe condition.

It is, therefore, an object of this invention to provide apparatus enabling a motor vehicle operator to clean periodically the vehicle running light lenses and restore the vehicle running lights to their normal illuminating efficency.

Apparatus constructed in accordance with the invention for cleaning the lens of a vehicle running light includes a fluid conduit extending peripherally around the lens of a motor vehicle running light. The conduit is operatively connected to a source of cleaning liquid under pressure, and has formed therein a plurality of orifices. These orifices are oriented so the fluid exiting therefrom will impinge on the running light lens in a circular pattern, thereby scrubbing dirt and foreign substances from said lens.

Further objects and advantages of this invention readily will become apparent when the following description is considered in connection with the accompanying drawings wherein:

FIGURE 1 is an illustration of a portion of the front of a motor vehicle;
FIGURE 2 is a view, partially in section, taken along the line 2—2 of FIGURE 1; and
FIGURE 3 is a view, partially in section, taken along the line 3—3 of FIGURE 2.

Referring now in detail to the drawings, the numeral 10 denotes a portion of a motor vehicle having a grill 12 and a fender 14 that cooperate to define a recess 16. Bezel 14' surrounds recess 16. Headlight 18, having a lens 20, is removably mounted in recess 16. For the purpose of this disclosure the term "lens" refers to the outer covering of a motor vehicle running light whether or not this outer covering serves to focus light.

A circular channel 22 is formed in the inside surface of bezel 14'. A fluid conduit 24 is located in channel 22 and circumferentially surrounds lens 20. Conduit 24 is operatively connected by means of a passage 26 with a suitable source of cleaning liquid as well as a suitable source of compressed air. The term "cleaning liquid" is meant to include liquid anti-freeze used to remove or prevent the formation of frozen substances on lens 20.

Suitable sources of liquid and compressed air such as mentioned above are well known in the art and constitute no part of the present invention. Conventional controls, obvious to one having ordinary skill in the art are provided so that cleaning liquid may be forced selectively through passage 26 by compressed air, or compressed air alone may be allowed to pass through passage 26. Air under a pressure of 125 p.s.i., for example, has been found suitable for the practice of this invention.

A plurality of circumferentially space orifices 28 are formed in conduit 24 and oriented so that liquid and air emerging therefrom will impinge upon lens 20 of running light 18. A diameter of .027", for example, has been found to be acceptable for orifices 28, although it will be clear that other diameter orifices could be used without departing from the scope of the invention. An insert ring 30, formed of corrosion resistant material, may be used to line circular channel 22 to prevent the deleterious corrosion of bezel 14' due to the presence of the cleaning fluid emitted from orifices 28.

Referring now to FIGURE 3, it can be seen that orifices 28 are so oriented in conduit 24 that fluid issuing therefrom will impinge upon lens 20 in streams having a variety of angular dispositions so that a generally circular pattern of fluid flow is promoted on lens 20. Tests have shown that such a circular pattern promotes a scrubbing action by the fluid on lens 20 that removes road grime and other foreign substances and provides lens 20 with a clean surface, thus greatly aiding the illuminating efficiency of lamp 18.

If the vehicle operator desires to clean the lens 20 during the operation of the vehicle he may cause, through simple controls mentioned above and well known in the art, the emission of cleaning liquid through orifices 28 by means of compressed air. The scrubbing action of this cleaning liquid as it impinges on lens 20 will, in itself, tend to remove unwanted substances from lens 20. However, further scrubbing by this cleaning liquid may be achieved by discontinuing the application of liquid and applying compressed air alone to lens 20 through orifices 28. A circular pattern of air impinging upon lens 20 will cause a further scrubbing action of the previous applied cleaning liquid. Furthermore, the passage of air alone through passage 26 and conduit 24 will clear these passageways of liquid and prevent blockage thereof due to freezing of the cleaning liquid during atmospheric low temperature periods.

It should be noted that if the curvature of the vehicle running light lens is substantial, a second row or more of orifices may be provided so that the entire surface of the lens is subject to the impinging of the cleaning liquid.

It may thus be seen that the invention provides a novel and useful apparatus allowing a vehicle operator to clean selectively road dirt and other unwanted substances from the lens of the vehicle running light. This cleaning may be accomplished by the vehicle operator without the discontinuance of the vehicle operation and may be repeated as needed.

We claim:
1. In a motor vehicle having body structure, a circular running light having a lens and mounted on said structure, a source of fluid under pressure, conduit means positioned in said body structure connected to said source of fluid under pressure and extending to points located about the periphery of said lens, a plurality of orifices connected in a fluid path with said conduit and circumferentially spaced about said lens, an imaginary line from the center of the lens to each orifice defining a lens radius, all of said orifices being angularly displaced to the same side of said lens radii such that pressurized streams of fluid from said orifices flow and join on the surface of said lens in a circular pattern.

2. The combination of claim 1, wherein said running light is a headlight.

3. The combination of claim 1 wherein said conduit means comprises a single conduit extending about the entire periphery of said lens.

References Cited

UNITED STATES PATENTS

| | | | |
|---|---|---|---|
| 1,145,159 | 7/1915 | Marsh | 15—250.01 |
| 1,465,292 | 8/1923 | Wessig. | |
| 2,312,187 | 2/1943 | Patterson | 239—284 |
| 2,968,071 | 1/1961 | Di Perna | 239—284 |
| 3,058,142 | 10/1962 | Pollock | 15—250.02 |
| 3,117,727 | 1/1964 | Pollock et al. | 240—7.1 |
| 3,127,116 | 3/1964 | Pollock et al. | 240—7.1 |
| 3,295,004 | 12/1966 | Hirsch. | |

MORRIS O. WOLK, Primary Examiner

JOSEPH T. ZATARGA, Assistant Examiner

U.S. Cl. X.R.

15—250.01; 134—34, 37; 239—284, 490, 567